United States Patent
George

(10) Patent No.: US 10,195,675 B2
(45) Date of Patent: Feb. 5, 2019

(54) TWIST DRILL WITH UNEQUAL FLUTE SPACING AND UNEQUAL RELIEF ANGLES

(71) Applicant: Kennametal Inc., Latrobe, PA (US)

(72) Inventor: Stephen Michael George, Greensboro, NC (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/448,427

(22) Filed: Mar. 2, 2017

(65) Prior Publication Data
US 2018/0250755 A1  Sep. 6, 2018

(51) Int. Cl.
*B23B 51/02*  (2006.01)

(52) U.S. Cl.
CPC .......... *B23B 51/02* (2013.01); *B23B 2251/04* (2013.01); *B23B 2251/202* (2013.01); *B23B 2251/282* (2013.01); *B23B 2251/408* (2013.01); *Y10T 408/9097* (2015.01)

(58) Field of Classification Search
CPC ............... B23B 51/02; B23B 2251/04; B23B 2251/202; B23B 2251/282; B23B 2251/408; Y10T 408/9097
See application file for complete search history.

(56) References Cited

U.S. PATENT DOCUMENTS

| | | | | |
|---|---|---|---|---|
| 4,662,803 A * | 5/1987 | Arnold | .................. | B23D 77/003 408/224 |
| 4,740,121 A * | 4/1988 | Arnold | .................. | B23D 77/003 408/224 |
| 4,913,603 A | 4/1990 | Friedli et al. | | |
| 5,947,659 A * | 9/1999 | Mays | ...................... | B23B 51/02 408/211 |
| 6,283,682 B1 * | 9/2001 | Plummer | ................ | B23B 51/02 408/144 |
| 7,354,229 B2 * | 4/2008 | Wakui | ..................... | B23B 51/02 408/227 |
| 7,665,935 B1 | 2/2010 | Garrick et al. | | |
| 8,105,001 B2 * | 1/2012 | Krenzer | .................. | B23B 51/02 408/227 |
| 8,734,068 B2 | 5/2014 | Krieg et al. | | |
| 8,834,080 B2 * | 9/2014 | Kauper | ................... | B23B 51/02 408/224 |
| 2008/0199268 A1 | 8/2008 | Krenzer et al. | | |

(Continued)

FOREIGN PATENT DOCUMENTS

FR          1075971 A  * 10/1954  ............. B23B 51/02

*Primary Examiner* — Eric A Gates
(74) *Attorney, Agent, or Firm* — Matthew S. Bedsole

(57) ABSTRACT

A twist drill having a shaft with a longitudinal axis, wherein the cutting tool includes a plurality of flutes extending about the longitudinal shaft along a helix angle and a plurality of lands adjacent the flutes. Each land has a cutting edge adjacent a corresponding flute and a margin (i.e. relief surface). A cutting point is adjacent a forward end of the shaft. A first, second and third forward cutting surfaces are adjacent the first, second and third cutting edges, respectively, and extend proximate the cutting point axially rearward for a predetermined length about the longitudinal axis of the shaft. The cutting edges are unequally angularly spaced from each other, and each forward cutting surface has a primary relief angle that are unequal to each other.

19 Claims, 3 Drawing Sheets

(56) References Cited

U.S. PATENT DOCUMENTS

| | | | |
|---|---|---|---|
| 2011/0135413 A1* | 6/2011 | Hobohm | B23D 77/00 408/1 R |
| 2011/0318128 A1* | 12/2011 | Schwagerl | B23B 51/02 408/200 |
| 2012/0195704 A1* | 8/2012 | White | B23B 51/0081 408/224 |

* cited by examiner

TWIST DRILL WITH UNEQUAL FLUTE SPACING AND UNEQUAL RELIEF ANGLES

CROSS NOTING TO RELATED APPLICATIONS

This application is related to U.S. application Ser. No. 12/852,756, now U.S. Pat. No. 8,734,068.

FIELD OF THE INVENTION

The present invention relates to a rotary cutting tool and, more particularly, to a twist drill with unequal flute spacing and relief angles.

BACKGROUND OF THE INVENTION

Cemented carbide rotary tools (i.e., tools driven to rotate) are commonly employed in machining operations such as, for example, drilling, reaming, countersinking, counterboring, end milling, and tapping. Such tools are typically of a solid monolithic construction. The manufacturing process for such tools may involve consolidating metallurgical powder (comprised of particulate ceramic and binder metal) to form a compact. The compact is then sintered to form a cylindrical tool blank having a solid monolithic construction. As used herein, monolithic construction means that the tools are composed of a material, such as, for example, a cemented carbide material, having substantially the same characteristics at any working volume within the tool. Subsequent to sintering, the tool blank is appropriately machined to form the cutting edge and other features of the particular geometry of the rotary tool. Rotary tools include, for example, drills, end mills, reamers, and taps.

Rotary tools composed of cemented carbides are adapted to many industrial applications, including the cutting and shaping of materials of construction such as metals, wood, and plastics. Cemented carbide tools are industrially important because of the combination of tensile strength, wear resistance, and toughness that is characteristic of these materials. Cemented carbides materials comprise at least two phases: at least one hard ceramic component and a softer matrix of metallic binder. The hard ceramic component may be, for example, carbides of elements within groups IVB through VIB of the periodic table. A common example is tungsten carbide. The binder may be a metal or metal alloy, typically cobalt, nickel, iron or alloys of these metals. The binder "cements" the ceramic component within a matrix interconnected in three dimensions. Cemented carbides may be fabricated by consolidating a metallurgical powder blend of at least one powdered ceramic component and at least one powdered binder.

Monolithic rotary tools may additionally comprise coolant channels extending through its body and shank to permit the flow of a coolant, such as oil or water, to the cutting surfaces of the rotary tool. The coolant may enter the channel at the shank end and exit at the drill point. The coolant cools the rotary tool and work piece and assists in ejecting chips and dirt from the hole. The use of coolant during machining operations allows for the use of higher cutting speeds of the rotary tool and faster feed rates, in addition to extending tool life. Rotary tools with coolant channels are especially suited for drilling deep holes in hard materials.

Drilling is a cutting operation in which material is removed from a workpiece to provide a bore in or through the workpiece. Drilling is carried out by advancing a rotating drilling tool or "drill" into the workpiece in the direction of the drill's longitudinal axis. Common drill configurations include, for example, twist drills and spade drills. A twist drill is characterized by one or more helical flutes disposed along at least a portion of the length of the drill and which terminate at a working end of the drill (the "drill tip"), which includes cutting edges. In contrast, a spade drill includes a wide cutting blade at the drill tip and lacks helical flutes along its length. Twist drills have a more complex geometrical design than spade drills due to the helical flutes, and this makes twist drills generally more difficult to manufacture. Twist drills are manufactured as either non-composite twist drills or composite twist drills.

A rotary cutting tool, such as a drill or twist drill, is generally comprised of a cylindrical shaft having at least one flute and land, which follow a helical angle to a forward cutting edge at the forward end of the shaft. The land has associated with it a margin and a clearance portion behind the margin. A side cutting edge is defined by the intersection of the flute with the margin of the land.

A problem that is experienced with a drill during the drilling process when the irregular rotational action of the drill during the drilling process results in an irregular surface structure of the boring wall is commonly known as "chatter." This phenomenon is because linear or spiral chip flutes are shaped into the generated surfaces of the drills to remove the chips that are formed during the drilling process. Frequently, the chip flutes on one hand and the cutting edges of the drill on the other hand are distributed symmetrically over the periphery of the drill. This symmetrical distribution has the further disadvantage that the vibrations of the drill that cause the "chatter" recur periodically during the drilling process. This periodic recurrence of the vibrations causes an increase in the amplitude of the vibrations, i.e. a "build-up" of the chatter during the drilling process. The result is that the irregularities in the side walls of the hole which is being bored, which irregularities are also called "chatter marks" increase, resulting in a deterioration in the quality of the boring over the length of the drilling process.

To reduce this problem, it is generally known that the minor cutting edges of the drill that are present on the drill periphery can be provided with lands. These lands are generally snug up against the inside wall of the boring and act on the drill in the manner of support fins. An additional measure to prevent the untrue running of the drill is the asymmetrical arrangement of the chip flutes and correspondingly of the drill cutting edges.

The present invention has been developed in view of the foregoing.

SUMMARY OF THE INVENTION

The problem of "chatter" is solved by providing a cutting tool having unequal flute spacing and unequal primary radial relief angles.

In one aspect of the invention, a cutting tool has a shaft with a longitudinal axis, wherein the cutting tool includes a first flute extending about the longitudinal shaft along a helix angle and a first land adjacent to the first flute and extending about the longitudinal axis of the shaft along the helix angle, wherein the first land has a first margin, and a first cutting edge adjacent the first flute; and a second flute extending about the longitudinal shaft along a helix angle and a second land adjacent to the second flute and extending about the longitudinal axis of the shaft along the helix angle, wherein the second land has a second margin, and a second cutting edge adjacent the second flute, wherein the first cutting edge and the second cutting edge are unequally angularly spaced from each other. A cutting point is located at a forward end of the shaft. A first forward cutting surface is adjacent the first cutting edge and extending from proximate the cutting point for a predetermined length about the longitudinal axis of the shaft. A first forward cutting surface is adjacent the first cutting edge and extending from proximate the cutting point for a predetermined length about the longitudinal axis of the shaft, wherein the first forward cutting surface and the second forward cutting surface have unequal primary radial relief angles.

In another aspect of the invention, a cutting tool has a shaft with a longitudinal axis, wherein the cutting tool includes a first flute extending about the longitudinal shaft along a helix angle and a first land adjacent to the first flute and extending about the longitudinal axis of the shaft along the helix angle, wherein the first land has a first margin, and a first cutting edge adjacent the first flute; a second flute extending about the longitudinal shaft along a helix angle and a second land adjacent to the second flute and extending about the longitudinal axis of the shaft along the helix angle, wherein the second land has a second margin, and a second cutting edge adjacent the second flute; and a third flute extending about the longitudinal shaft along a helix angle and a third land adjacent to the third flute and extending about the longitudinal axis of the shaft along the helix angle, wherein the third land has a third margin, and a third cutting edge adjacent the third flute. A cutting point is located at a forward end of the shaft. A first forward cutting surface is adjacent the first cutting edge and extends from proximate the cutting point for a predetermined length about the longitudinal axis of the shaft. A second forward cutting surface is adjacent the second cutting edge and extends from proximate the cutting point for the predetermined length about the longitudinal axis of the shaft. A third forward cutting surface is adjacent the third cutting edge and extends from proximate the cutting point for the predetermined length about the longitudinal axis of the shaft, wherein the first cutting edge, the second cutting edge and the third cutting edge are unequally angularly spaced from each other, and wherein the first forward cutting surface, the second forward cutting surface and the third forward cutting surface have unequal primary radial relief angles.

These and other aspects of the present invention will be more fully understood following a review of this specification and drawings.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

In one aspect of the invention, the invention is directed to a rotary cutting tool having at least one helical flute. For purposes of explanation, a twist drill will be described herein with the understanding that the invention is applicable to other cutting tools having one or more helical flutes, such as, for example, taps and reamers. In addition, a cutting tool having three helical flutes is described herein. However, it will be appreciated that the invention is not limited by the number of helical flutes, and that the invention can be practiced with a cutting tool having two or more helical flutes.

Figure 1:
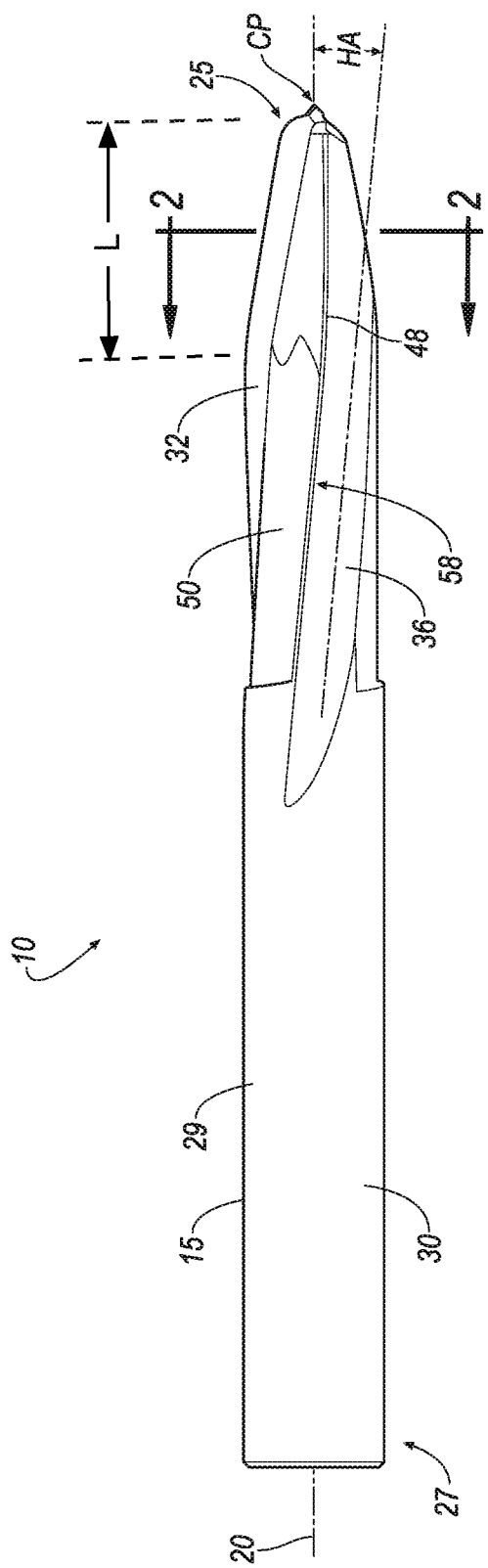
FIG. 1 is a side elevational view of a cutting tool, in accordance with an aspect of the invention.
Figure 2:
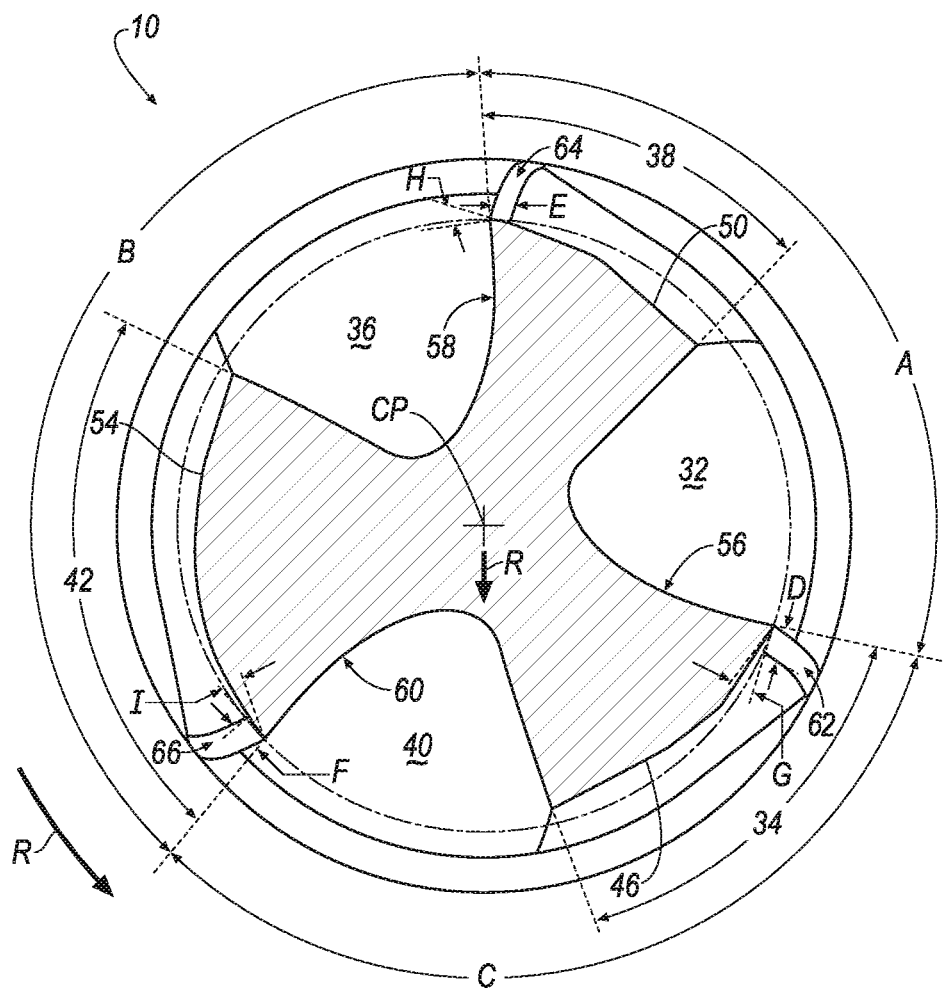
FIG. 2 is a section view taken along line 2-2 of FIG. 1, in accordance with an aspect of the invention.

Referring to FIGS. 1 and 2, there is shown a cutting tool 10 which, for purposes of description herein, will be referred to as a monolithic twist drill, having a shaft 15 with a longitudinal axis 20. "Monolithic", as used herein, does not mean that the rotary cutting tool must be made from a single material. The rotary cutting tool may indeed be fabricated from a combination of materials or composites, using a variety of techniques such as gluing, welding or shrink fitting. Therefore, the term "monolithic", as used herein, means that the rotary cutting tool is fabricated as one whole, in a suitable way, so as to withstand the high stresses that are induced by centrifugal forces upon rotation, and that it is not practical to dismantle them after fabrication.

The shaft 15 has a forward end 25 capable of contacting and cutting a work piece (not shown). At a rearward end 27 of the shaft 15 is a shank 29, which may be generally cylindrical, or may have a non-cylindrical shape to fit within a chuck (not shown). While the shank 29 is illustrated as cylindrical, it should be appreciated that the shank 29 may have other shapes such as, for example, square, hexagonal, conical, or any other suitable non-cylindrical shape for gripping within a chuck.

The shaft 15 has an external cylindrical surface 30 having formed therein a first flute 32 with a corresponding first land 34, a second flute 36 with a corresponding second land 38, and a third flute 40 having a corresponding third land 42. Each land extends about the longitudinal axis 20 along a helix angle HA (shown in FIG. 1). In the illustrated embodiment, the helix angle HA defines a right-hand helix. In addition, the first land 34 includes a first margin 44 and a corresponding first clearance portion 46. The second land 38 has a second margin 48 and a corresponding second clearance portion 50. The third land 42 has a third margin 52 and a corresponding third clearance portion 54. It should be understood that the first, second and third margins 44, 46, 48 are generally cylindrical surfaces along the first, second and third flutes 32, 36, 40, respectively.

Adjacent to the first flute 32 is a first cutting edge 56. Similarly, adjacent to the second flute 36 is a second cutting edge 58 and adjacent to the third flute 40 is a third cutting edge 60. In one aspect of the invention, the first cutting edge 56, the second cutting edge 58, and the third cutting edge 60 are all offset from a center cutting point CP adjacent the forward end 25 of the shaft 15 (see FIG. 3).

In one aspect of the invention, the first cutting edge 56, the second edge cutting edge 58, and the third cutting edge 60 are unequally angularly spaced from each other. More specifically, as shown in FIG. 2, the first cutting edge 56 is angularly spaced from the second cutting edge 58 at an angle A, the second cutting edge 58 is angularly spaced from the third cutting edge 60 at an angle B, and the third cutting edge 60 is angularly spaced from the first cutting edge 56 at an angle C. By providing the unequal angular spacing between the three cutting edges 56, 58 and 60, the problem associated with drill bits described herein regarding "chatter" may be minimized, as will be explained in more detail herein.

In another aspect of the invention, angle A may be in the range of about 100 degrees to about 115 degrees. Angle B may be in the range of about 110 degrees to about 125 degrees. Angle C may be in the range of about 125 degrees to about 140 degrees. In an exemplary embodiment of the invention, angle A equals 108 degrees, angle B equals 118 degrees, and angle C equals 134 degrees. Thus, it will be appreciated that in accordance with aspects of the invention, angles A, B, and C are all unequal for a drill bit configuration.

Figure 3:
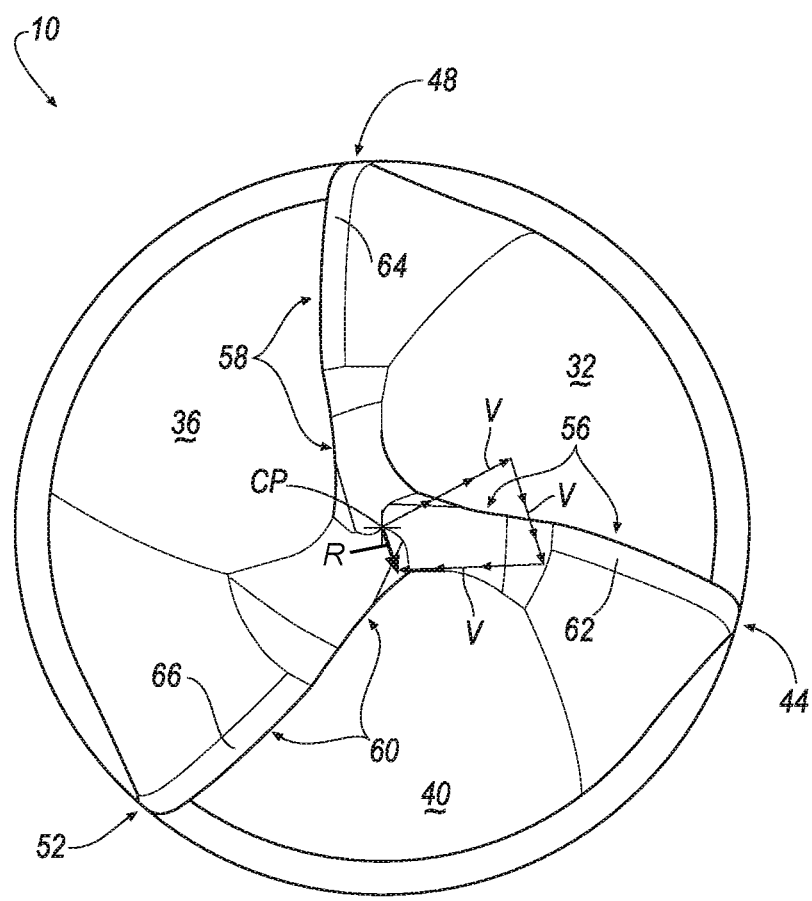
FIG. 3 is a resultant force diagram of the cutting tool shown in FIGS. 1 and 2, in accordance with an aspect of the invention.

The forward end 25 of the cutting tool 10 includes a first forward cutting surface 62 adjacent the first cutting edge 56, a second forward cutting surface 64 adjacent the second cutting edge 58, and a third cutting surface 66 adjacent the third cutting edge 60 (see FIG. 3). As seen in FIG. 1, the diameter of the cutting tool 10 gradually increases axially rearward for a predetermined length L from approximately the cutting point CP toward the shaft 30 until first, second and third forward cutting surfaces 62, 64, 66 reach the first, second and third margins 44, 46, 48 at which the cutting tool 10 has the largest cutting diameter. The first, second and third forward cutting surfaces 62, 64, 66 extend from proximate the cutting point CP along the first, second and third cutting edges 56, 58, 60, respectively, for approximately the predetermined length L to the first, second and third margins 42, 46, 48. It should be appreciated that the predetermined length L may be approximately equal, or may be different for one or all of the first, second and third forward cutting surfaces 62, 64, 66. Unlike the generally cylindrically-shaped first, second and third surfaces 44, 48, 52, the first, second and third forward cutting surfaces 62, 64, 66 are not generally cylindrically-shaped surfaces, but may have a non-cylindrical form.

In another aspect of the invention, the first, second and third forward cutting surfaces 62, 64, 66 all have unequal peripheral dimensions. More specifically, as shown in FIG. 2 the first forward cutting surface 62 has a peripheral dimension corresponding to an angle D, as indicated by arrow D. The second forward cutting surface 64 has a peripheral dimension corresponding to an angle E, as indicated by arrow E. The third forward cutting surface 66 has a peripheral dimension corresponding to an angle F, as indicated by arrow F. As used herein, "peripheral dimension" means an arc length for forward cutting surface 62, 64 and 66 that is calculated based on a corresponding angle. Providing the margins to have unequal peripheral dimensions further contributes to reducing the described problem of chatter in drill bits.

In one aspect of the invention, the angle D may be in the range of about 4.0 degrees to about 10.0 degrees. The angle E may be in the range of about 0.2 degrees to about 8.0 degrees. The angle F may be in the range of about 12.0 degrees to about 20.0 degrees. In an exemplary embodiment of the invention, the angle D is 5.0 degrees the angle E is 2.0 degrees and the angle F is 15.0 degrees.

In another aspect of the invention, the first forward cutting surface 62, the second forward cutting surface 64, and the third cutting surface 66 all have unequal primary radial relief angles. More specifically, as shown in FIG. 2 the first forward cutting surface 62 has a primary radial relief angle corresponding to an angle G, as indicated by arrow G. The second forward cutting surface 64 has a primary radial relief angle corresponding to an angle H, as indicated by arrow H. The third forward cutting surface 66 has a peripheral dimension corresponding to an angle I, as indicated by arrow I. Providing the first, second and third forward cutting surfaces 62, 64, 66 with unequal primary radial relief angles further contributes to reducing the described problem of chatter in drill bits.

In one aspect of the invention, the angle G may be in the range of about 8.0 degrees to about 10.5 degrees. The angle H may be in the range of about 11.0 degrees to about 13.0 degrees. The angle I may be in the range of about 4.0 degrees to about 7.0 degrees. In an exemplary embodiment of the invention, the angle G is 10.0 degrees, the angle H is 12.0 degrees and the angle I is 6.0 degrees.

FIG. 3 is a resultant force diagram for the cutting tool 10, e.g., the drill bit, in accordance with an aspect of the invention. Along each cutting edge (56, 58, 60) are displayed various representative force vectors. These vectors change in magnitude (indicated by their length and radius of inscribed circle where larger length and radius equals greater magnitude) based on their distance from the center cutting point CP, and therefore are related to their respective cutting velocity. The direction of these vectors in the diagram is determined by being constructed tangent to the direction of velocity of the cutting edge at the point at which they are displayed. Placing these representative force vectors "head-to-tail" in the method of a classic force analysis results in the chain of vectors V shown originating from center CP. It can then be seen that as the vectors do not return to the center cutting point CP, there must be a resultant force that is acting on the tool from this unbalance. This resultant force R is also shown originating from the center CP and connecting to the end of the vector chain, and shows the representative magnitude and direction of force R that is important to the invention. The resultant force R is directed generally between the forward cutting surfaces 62 and 66, therefore shifting the contact force against the hole wall to these cutting surfaces. Therefore, the second forward cutting surface 64 can be minimized in its size (i.e. angle E) and have the largest primary radial relief angle H to reduce friction. The first and third forward cutting surfaces 62 and 66, respectively, are larger than the second forward cutting surface 64 to act against the resultant force R, with the third forward cutting surface 66 being the largest because it is placed closer to the direction of the force. In addition, the third forward cutting surface 66 has the smallest primary radial relief angle I, while the first forward cutting surface 62 has the second smallest primary radial relief angle G. This arrangement causes the largest third forward cutting surface 66 to act as a guiding land, acting against the disruptive forces of chatter by always maintaining contact with the hole wall, and therefore damping radial motion. In this three-flute arrangement of the invention, the first forward cutting surface 62 also acts in support of third forward cutting surface 66 to actively engage in contact with the hole wall and, as it is positioned along a third cutting edge and allows a higher feed rate to be achieved. These characteristics in turn cause the hole making process to have greatly enhanced size, straightness, and cylindricity control at much higher metal removal rates than without use of the invention.

The patents and publications referred to herein are hereby incorporated by reference.

Having described presently preferred embodiments the invention may be otherwise embodied within the scope of the appended claims.

What is claimed is:

1. A twist drill having a shaft with a longitudinal axis, the twist drill comprising:
  a first flute extending about the longitudinal shaft along a helix angle and a first land adjacent to the first flute and extending about the longitudinal axis of the shaft along the helix angle, wherein the first land has a first margin, and a first cutting edge adjacent the first flute;

a second flute extending about the longitudinal shaft along the helix angle and a second land adjacent to the second flute and extending about the longitudinal axis of the shaft along the helix angle, wherein the second land has a second margin, and a second cutting edge adjacent the second flute;

a third flute extending about the longitudinal shaft along the helix angle and a third land adjacent to the third flute and extending about the longitudinal axis of the shaft along the helix angle, wherein the third land has a third margin, and a third cutting edge adjacent the third flute;

a cutting point located at a forward end of the shaft;

a first forward cutting surface adjacent the first cutting edge and extending from proximate the cutting point axially rearward a predetermined length in a direction of the longitudinal axis of the shaft;

a second forward cutting surface adjacent the second cutting edge and extending from proximate the cutting point axially rearward the predetermined length in the direction of the longitudinal axis of the shaft; and a third forward cutting surface adjacent the third cutting edge and extending from proximate the cutting point axially rearward the predetermined length in the direction of the longitudinal axis of the shaft, wherein the first forward cutting surface and the second forward cutting surface have unequal primary radial relief angles.

2. The twist drill of claim 1, wherein the first forward cutting surface has a primary radial relief angle in the range of about 8.0 degrees to about 10.5 degrees.

3. The twist drill of claim 1, wherein the second forward cutting surface has a primary radial relief angle in the range of about 11.0 degrees to about 13.0 degrees.

4. The twist drill of claim 1, wherein the first forward cutting surface and the second forward cutting surface have a non-cylindrical form.

5. The twist drill of claim 1, wherein the first forward cutting surface, the second forward cutting surface and the third forward cutting surface have unequal primary radial relief angles.

6. The twist drill of claim 1, wherein the first cutting edge, the second cutting edge and the third cutting edge are unequally angularly spaced from each other.

7. The twist drill of claim 1, wherein the third forward cutting surface has a primary radial relief angle in the range of about 4.0 degrees to about 7.0 degrees.

8. The twist drill of claim 1, wherein the first cutting edge is angularly spaced from the second cutting edge at an angle in the range of about 100 degrees to about 115 degrees.

9. The twist drill of claim 1, wherein the second cutting edge is angularly spaced from the third cutting edge at an angle in the range of about 110 degrees to about 125 degrees.

10. The twist drill of claim 1, wherein the third cutting edge is angularly spaced from the first cutting edge at an angle in the range of about 125 degrees to about 140 degrees.

11. The twist drill of claim 1, wherein the first cutting edge and the second cutting edge are offset from the cutting point.

12. The twist drill of claim 1, wherein the first forward cutting surface and the second forward cutting surface have unequal peripheral dimensions.

13. The twist drill of claim 12, wherein the first forward cutting surface has a peripheral dimension corresponding to an angle in the range of about 4.0 degrees to about 1.0 degrees.

14. The twist drill of claim 12, wherein the second forward cutting surface has a peripheral dimension corresponding to an angle in the range of about 0.2 degrees to about 8.0 degrees.

15. A twist drill having a shaft with a longitudinal axis, the twist drill comprising:

a first flute extending about the longitudinal shaft along a helix angle and a first land adjacent to the first flute and extending about the longitudinal axis of the shaft along the helix angle, wherein the first land has a first margin, and a first cutting edge adjacent the first flute;

a second flute extending about the longitudinal shaft along a helix angle and a second land adjacent to the second flute and extending about the longitudinal axis of the shaft along the helix angle, wherein the second land has a second margin, and a second cutting edge adjacent the second flute;

a third flute extending about the longitudinal shaft along a helix angle and a third land adjacent to the third flute and extending about the longitudinal axis of the shaft along the helix angle, wherein the third land has a third margin, and a third cutting edge adjacent the third flute;

a cutting point located a forward end of the shaft;

a first forward cutting surface adjacent the first cutting edge and extending from proximate the cutting point axially rearward a predetermined length about the longitudinal axis of the shaft;

a second forward cutting surface adjacent the second cutting edge and extending proximate the cutting point axially rearward the predetermined length about the longitudinal axis of the shaft; and a third forward cutting surface adjacent the third cutting edge and extending proximate the cutting point axially rearward the predetermined length about the longitudinal axis of the shaft, wherein the first cutting edge, the second cutting edge and the third cutting edge are unequally angularly spaced from each other, and wherein the first forward cutting surface and the second forward cutting surface have unequal primary radial relief angles.

16. The twist drill of claim 15, wherein the first forward cutting surface has a primary radial relief angle in the range of about 8.0 degrees to about 10.5 degrees.

17. The twist drill of claim 15, wherein the second forward cutting surface has a primary radial relief angle in the range of about 11.0 degrees to about 13.0 degrees.

18. The twist drill of claim 15, wherein the third forward cutting surface has a primary radial relief angle in the range of about 4.0 degrees to about 7.0 degrees.

19. The twist drill of claim 15, wherein the first cutting edge, the second cutting edge and the third cutting edge are all offset from the cutting point.

* * * * *